United States Patent
Hougui et al.

(10) Patent No.: US 7,177,474 B2
(45) Date of Patent: Feb. 13, 2007

(54) VIDEO TO ANIMATION CONVERSION WITH FILE SIZE CONSTRAINT

(75) Inventors: Yair Hougui, Tel-Mond (IL); Vladislav Novikov, Netanya (IL)

(73) Assignee: Mobixell Networks Inc., Wilmington, DE (US)

( * ) Notice: Subject to any disclaimer, the term of this patent is extended or adjusted under 35 U.S.C. 154(b) by 156 days.

(21) Appl. No.: 10/985,026

(22) Filed: Nov. 10, 2004

(65) Prior Publication Data
US 2005/0122427 A1 Jun. 9, 2005

Related U.S. Application Data

(60) Provisional application No. 60/518,310, filed on Nov. 10, 2003.

(51) Int. Cl.
*G06K 9/46* (2006.01)

(52) U.S. Cl. ............... 382/236; 382/162; 382/163; 382/166; 382/167; 345/589; 345/590; 345/600; 345/603

(58) Field of Classification Search ............... None
See application file for complete search history.

(56) References Cited

U.S. PATENT DOCUMENTS

| | | | |
|---|---|---|---|
| 5,215,095 A | 6/1993 | Macvicar et al. | |
| 5,754,700 A | 5/1998 | Kuzma | |
| 6,101,276 A | 8/2000 | Adiletta et al. | |
| 6,111,975 A | 8/2000 | Sacks et al. | |
| 6,356,309 B1 | 3/2002 | Masaki et al. | |
| 6,518,981 B2 | 2/2003 | Zhao et al. | |
| 6,571,242 B1 | 5/2003 | Hao et al. | |
| 6,711,302 B1 | 3/2004 | Lee | |
| 2002/0037101 A1 | 3/2002 | Aihara | |
| 2003/0053085 A1 | 3/2003 | Takemoto | |
| 2003/0164826 A1 | 9/2003 | Lavelle et al. | |
| 2004/0119726 A1 | 6/2004 | Li | |

*Primary Examiner*—Mark Zimmerman
*Assistant Examiner*—Jwalant Amin
(74) *Attorney, Agent, or Firm*—AlphaPatent Associates Ltd.; Daniel J. Swirsky

(57) ABSTRACT

A method for converting video from a first format into a second format, the method including decoding into a series of frames video that is encoded in a first format, mapping the colors represented in the frames into a palette having fewer colors than the number of colors represented in the frames, removing noise from the frames, selectably removing at least one frame from the sequence, and re-encoding the sequence using the fewer colors into a second video format.

44 Claims, 17 Drawing Sheets

COLOR USAGE TABLE
320

| FRAME N | | | |
|---|---|---|---|
| 15 | 112 | 80 | 90 |
| 91 | 75 | 12 | 10 |
| 15 | 112 | 81 | 93 |
| 91 | 75 | 12 | 10 |

520

| FRAME N+1 | | | |
|---|---|---|---|
| 15 | 112 | 81 | 93 |
| 91 | 60 | 42 | 20 |
| 15 | 112 | 81 | 50 |
| 91 | 75 | 12 | 10 |

500

| DIFFERENCE FRAME | | | |
|---|---|---|---|
| 0 | 0 | 1 | 3 |
| 0 | 15 | 30 | 10 |
| 0 | 0 | 0 | 43 |
| 0 | 0 | 0 | 0 |

Fig. 5A

VIDEO TO ANIMATION CONVERSION WITH FILE SIZE CONSTRAINT

CROSS-REFERENCE TO RELATED APPLICATIONS

This application claims priority from U.S. Provisional Patent Application No. 60/518,310, filed Nov. 10, 2003, incorporated herein by reference in its entirety.

FIELD OF THE INVENTION

The present invention relates to animation in general, and more particularly to the conversion of video to animation with file size constraints.

BACKGROUND OF THE INVENTION

Digital video is fast becoming a popular and ubiquitous means of communications. The proliferation of digital cameras embedded in cellular telephones enables the rapid creation and transmission of digital videos. To minimize the quantity of data transmitted, digital videos are typically encoded prior to transport.

The recipient of a digital video must typically utilize a computational device capable of decoding the digital video and rendering the video stream. Such devices require computational power in proportion to the complexity of the decoding technique necessary to decode the encoded video.

SUMMARY OF THE INVENTION

The present invention discloses a system and method for conversion of video to animation with file size constraints.

In one aspect of the present invention a method is provided for converting video from a first format into a second format, the method including decoding into a series of frames video that is encoded in a first format, mapping the colors represented in the frames into a palette having fewer colors than the number of colors represented in the frames, removing noise from the frames, selectably removing at least one frame from the sequence, and re-encoding the sequence using the fewer colors into a second video format.

In another aspect of the present invention a method is provided for color quantization of a sequence of video frames, the method including mapping a plurality of pixels in a series of video frames to a corresponding color in a palette, defining a plurality of groups of colors in the palette, weighting each of the colors in any of the color groups by its respective number of occurrences of each of the pixels of a particular color, where the weighting is applied to each color value in the color to be weighted, summing the weighted color values in any of the color groups, summing the number of occurrences of each of the pixels in the color group, and dividing the summed weighted color values in the color group by the summed number of occurrences, thereby yielding a single color that represents the weighted mean of the color group.

In another aspect of the present invention the defining step includes masking the pixels with a bit mask.

In another aspect of the present invention the method further includes maintaining a count for each of the numbers of occurrences.

In another aspect of the present invention the summing steps comprise separately summing for each color component of the color group.

In another aspect of the present invention the dividing step includes separately dividing each color component of the color group by the summed number of occurrences.

In another aspect of the present invention the method further includes merging the weighted mean color with a neighboring weighted mean color where the summed number of occurrences of the first-mentioned weighted mean color is below a predefined occurrence threshold, and where the difference between the merged color value and the value of the first-mentioned weighted mean color is below a predefined error threshold.

In another aspect of the present invention the merging step is performed a plurality of times until a merged palette is formed having a predetermined number of weighted mean colors.

In another aspect of the present invention the method further includes constructing a set of indexed images corresponding to the frames of the original video where each pixel in the indexed images points to a color in the merged palette.

In another aspect of the present invention a method is provided for smoothing an indexed palletized image, the method including rasterwise scanning the pixels of a palletized image with a sliding window, determining a pixel value occurring most often within the window, and setting any of the pixels within the window to the most often occurring pixel value.

In another aspect of the present invention the setting step includes setting one of the pixels within a first distance from the leading extent of the window and within a second distance from the trailing extent of the window to the most often occurring pixel value.

In another aspect of the present invention the setting step includes setting where the distances differ.

In another aspect of the present invention the method further includes weighting any of the pixel values occurring within the window in accordance with a positionally corresponding predefined weight, where the weighting step is performed prior to performing the determining step.

In another aspect of the present invention a method is provided for processing a region of interest in a sequence of frames, the method including deriving a difference frame between two consecutive frames in a sequence of frames, where each pixel position value in the difference frame is set equal to the absolute pixel value difference between its positionally corresponding pixels in both of the consecutive frames, deriving a region of interest mask by multiplying the pixel position values in the difference frame by a weight map and setting any of the pixel position values in the region of interest mask to a predefined value as a function of its weighted value with respect to a predefined threshold, defining a region of interest within the last of the two consecutive frames to include pixels that positionally correspond to pixel positions in the region of interest mask that have a predefined value, and setting any of the pixels in the last of the two consecutive frames that lie inside the region of interest as transparent pixels if the pixels are identical to their positionally corresponding pixels in the first of the two consecutive frames and if the pixels are not part of a larger sequence of contiguous pixels with identical values.

In another aspect of the present invention the method further includes excluding any of the pixels in the last of the two consecutive frames that lie outside the region of interest from being used to reconstruct the last frame.

In another aspect of the present invention the method further includes identifying a segment of pixels in the region of interest, beginning at a pixel location corresponding to a pixel location in the difference frame whose value is equal to 0, determining the number of contiguous pixels in the region of interest extending from the pixel location whose corresponding pixel locations in the difference frame all have a value equal to 0, thereby resulting in a transparency candidate run length, determining the number of contiguous pixels in the region of interest extending from the pixel location having identical color values, thereby resulting in an identical color run length, determining the length of the segment as the longer of the run lengths, and setting the values of the pixels in the segment to a transparent pixel value if the transparency candidate run is longest.

In another aspect of the present invention a method is provided for frame selection, the method including determining the size of a video segment, should the size exceed a predefined limit measuring the amount of information in a frame of the video segment, dropping the frame if the amount of information is below a predefined threshold.

In another aspect of the present invention the measuring step includes selecting the frame as part of two consecutive frames, and measuring the magnitude of change that occurs between the frame the other selected frame.

In another aspect of the present invention the measuring magnitude of change step includes measuring using the following formula $$\text{SCENE CHANGE} = \frac{1}{N*M} * \sum_{N}^{1} \sum_{M}^{1} |p1(i,j) - p2(i,j)| * w(i,j)$$

where N and M are the ROI dimensions, $p_k(i,j)$ is the value of pixel (i,j) in the $k_{th}$ frame and w(i,j) is a weight of a pixel, In another aspect of the present invention the measuring magnitude of change step includes dividing the sum of absolute difference between pixels in a region of interest of the frame with corresponding pixels in the other selected frame by the number of pixels in the region of interest.

In another aspect of the present invention the method further includes performing the steps a plurality of times for a plurality of frames of the video segment until the size does not exceed the predefined limit.

In another aspect of the present invention the method further includes recalculating a region of interest and transparency pixels for a subsequent frame of the dropped frame.

In another aspect of the present invention the method further includes calculating a display duration for the frame to be dropped, retaining the frame in the video sequence if the display duration exceeds a predefined duration threshold.

In another aspect of the present invention a system is provided for converting video from a first format into a second format, the system including means for decoding into a series of frames video that is encoded in a first format, means for mapping the colors represented in the frames into a palette having fewer colors than the number of colors represented in the frames, means for removing noise from the frames, means for selectably removing at least one frame from the sequence, and means for re-encoding the sequence using the fewer colors into a second video format.

In another aspect of the present invention a system is provided for color quantization of a sequence of video frames, the system including means for mapping a plurality of pixels in a series of video frames to a corresponding color in a palette, means for defining a plurality of groups of colors in the palette, means for weighting each of the colors in any of the color groups by its respective number of occurrences of each of the pixels of a particular color, where the weighting is applied to each color value in the color to be weighted, means for summing the weighted color values in any of the color groups, means for summing the number of occurrences of each of the pixels in the color group, and means for dividing the summed weighted color values in the color group by the summed number of occurrences, thereby yielding a single color that represents the weighted mean of the color group.

In another aspect of the present invention the means for defining is operative to masking the pixels with a bit mask.

In another aspect of the present invention the system further includes means for maintaining a count for each of the numbers of occurrences.

In another aspect of the present invention the means for summing are operative to separately sum for each color component of the color group.

In another aspect of the present invention the means for dividing is operative to separately divide each color component of the color group by the summed number of occurrences.

In another aspect of the present invention the system further includes means for merging the weighted mean color with a neighboring weighted mean color where the summed number of occurrences of the first-mentioned weighted mean color is below a predefined occurrence threshold, and where the difference between the merged color value and the value of the first-mentioned weighted mean color is below a predefined error threshold.

In another aspect of the present invention the means for merging is operative to merge a plurality of times until a merged palette is formed having a predetermined number of weighted mean colors.

In another aspect of the present invention the system further includes means for constructing a set of indexed images corresponding to the frames of the original video where each pixel in the indexed images points to a color in the merged palette.

In another aspect of the present invention for smoothing an indexed palletized image, the system including means for rasterwise scanning the pixels of a palletized image with a sliding window, means for determining a pixel value occurring most often within the window, and means for setting any of the pixels within the window to the most often occurring pixel value.

In another aspect of the present invention the means for setting is operative to set one of the pixels within a first distance from the leading extent of the window and within a second distance from the trailing extent of the window to the most often occurring pixel value.

In another aspect of the present invention the means for setting is operative to set where the distances differ.

In another aspect of the present invention the system further includes means for weighting any of the pixel values occurring within the window in accordance with a positionally corresponding predefined weight, where the means for weighting is operative to weight prior to performing the determining step.

In another aspect of the present invention a system is provided for processing a region of interest in a sequence of frames, the system including means for deriving a difference frame between two consecutive frames in a sequence of frames, where each pixel position value in the difference frame is set equal to the absolute pixel value difference between its positionally corresponding pixels in both of the consecutive frames, means for deriving a region of interest mask by multiplying the pixel position values in the difference frame by a weight map and setting any of the pixel position values in the region of interest mask to a predefined value as a function of its weighted value with respect to a predefined threshold, means for defining a region of interest within the last of the two consecutive frames to include pixels that positionally correspond to pixel positions in the region of interest mask that have a predefined value, and means for setting any of the pixels in the last of the two consecutive frames that lie inside the region of interest as transparent pixels if the pixels are identical to their positionally corresponding pixels in the first of the two consecutive frames and if the pixels are not part of a larger sequence of contiguous pixels with identical values.

In another aspect of the present invention the system further includes means for excluding any of the pixels in the last of the two consecutive frames that lie outside the region of interest from being used to reconstruct the last frame.

In another aspect of the present invention the system further includes means for identifying a segment of pixels in the region of interest, beginning at a pixel location corresponding to a pixel location in the difference frame whose value is equal to 0, means for determining the number of contiguous pixels in the region of interest extending from the pixel location whose corresponding pixel locations in the difference frame all have a value equal to 0, thereby resulting in a transparency candidate run length, means for determining the number of contiguous pixels in the region of interest extending from the pixel location having identical color values, thereby resulting in an identical color run length, means for determining the length of the segment as the longer of the run lengths, and means for setting the values of the pixels in the segment to a transparent pixel value if the transparency candidate run is longest.

In another aspect of the present invention a system is provided for frame selection, the system including means for determining the size of a video segment, means for should the size exceed a predefined limit means for measuring the amount of information in a frame of the video segment, means for dropping the frame if the amount of information is below a predefined threshold.

In another aspect of the present invention the means for measuring is operative to select the frame as part of two consecutive frames, and measure the magnitude of change that occurs between the frame the other selected frame.

In another aspect of the present invention the means for measuring magnitude of change is operative to measure using the following formula $$\text{SCENE CHANGE} = \frac{1}{N*M} * \sum_{N}^{1} \sum_{M}^{1} |p1(i, j) - p2(i, j)| * w(i, j)$$

where N and M are the ROI dimensions, $p_k(i,j)$ is the value of pixel (i,j) in the $k_{th}$ frame and w(i,j) is a weight of a pixel, In another aspect of the present invention the means for measuring magnitude of change is operative to divide the sum of absolute difference between pixels in a region of interest of the frame with corresponding pixels in the other selected frame by the number of pixels in the region of interest.

In another aspect of the present invention the means are operative for a plurality of frames of the video segment until the size does not exceed the predefined limit.

In another aspect of the present invention further includes means for recalculating a region of interest and transparency pixels for a subsequent frame of the dropped frame.

In another aspect of the present invention the system further includes means for calculating a display duration for the frame to be dropped, means for retaining the frame in the video sequence if the display duration exceeds a predefined duration threshold.

BRIEF DESCRIPTION OF THE DRAWINGS

The present invention will be understood and appreciated more fully from the following detailed description taken in conjunction with the appended drawings in which:

FIGS. 3A through 3E are simplified illustrations of color palettes constructed and operative in accordance with a preferred embodiment of the present invention;

FIGS. 5A through 5E are simplified illustrations of the processing of a region of interest in a sequence of frames, constructed and operative in accordance with a preferred embodiment of the present invention.

DETAILED DESCRIPTION OF PREFERRED EMBODIMENTS

Figure 1A:
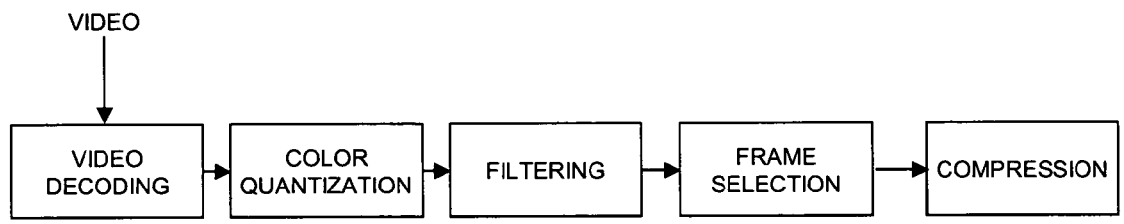
FIG. 1A is a simplified illustration of a video conversion process, operative in accordance with a preferred embodiment of the present invention.

Reference is now made to FIG. 1A, which is a simplified illustration of a video conversion process, operative in accordance with a preferred embodiment of the present invention. In the first step encoded video, such as MPEG-4 encoded video, received from an external source is preferably decoded into a series of frames. Next, the colors used to represent the entire set of frames, i.e. the global color map is preferably reduced through color quantization. Colors are mapped from 'true' colors' found in the original video to a subset of colors represented by a relatively small palette, as described in more detail hereinbelow with reference to FIGS. 2A, 2B, and 3A through 3E. A filtering mechanism may be employed to remove noise and increase subsequent compression, as described hereinbelow with reference to FIGS. 4 and 5. Finally, to further reduce the size of the converted video, selected frames may be removed from the sequence, preferably as described in more detail hereinbelow with reference to FIG. 6. The final sequence of frames may then be re-encoded into a format suitable for representation, such as animated GIF.

Figure 1B:
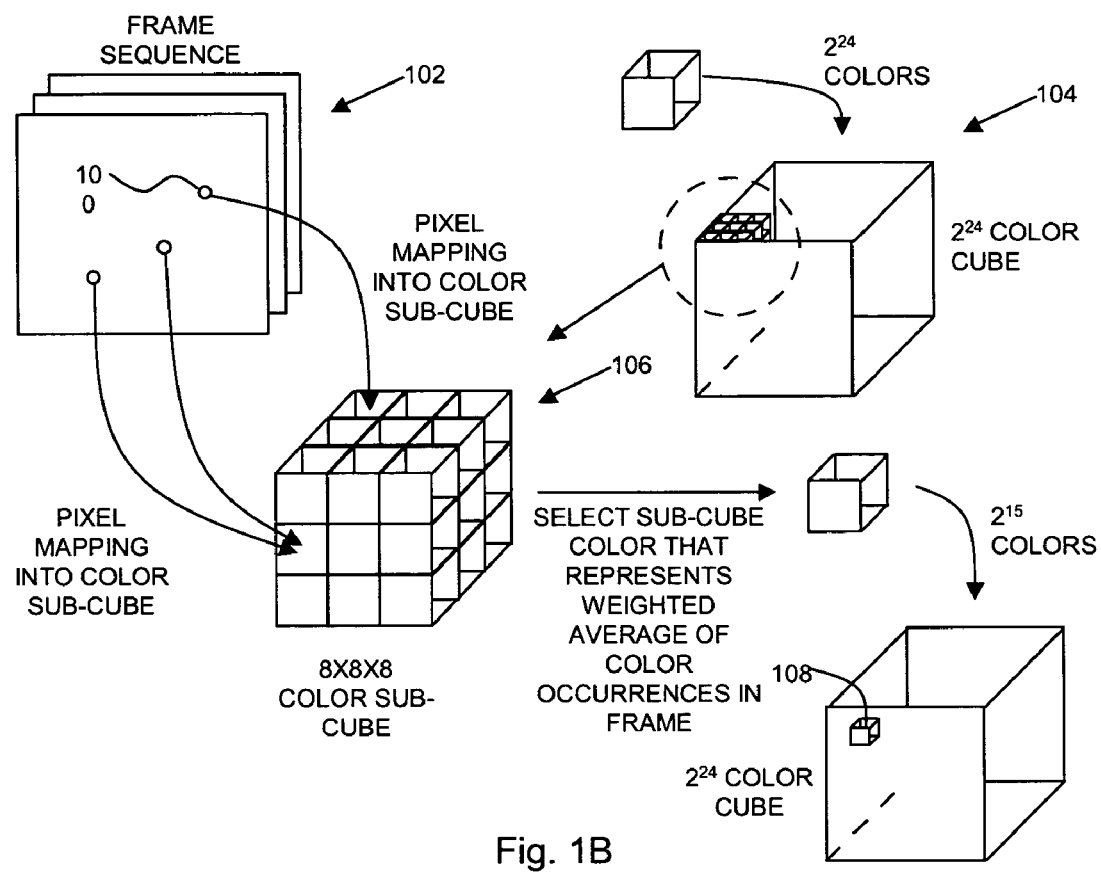
FIG. 1B is a simplified conceptual illustration of a method for color quantization of a sequence of frames, constructed and operative in accordance with a preferred embodiment of the present invention.

Reference is now made to FIG. 1B, which is a simplified conceptual illustration of a method for color quantization of a sequence of frames, constructed and operative in accordance with a preferred embodiment of the present invention. In FIG. 1B, each pixel 100 in a series of video frames 102 is mapped to a corresponding color in a palette, such as a 24-bit palette, shown as a cube 104, where the three dimensions of cube 104 correspond to the three values of a pixel's red, green, and blue (RGB) color components. Pixels of similar color are preferably mapped to the same color group within cube 104, shown as a sub-cube 106. A count, not shown, is preferably maintained for each color in cube 104 of the number of occurrences of each pixel 100 that maps to a particular color. Each of the colors in a color group may be weighted by its respective count, with the weighted color values in the group summed and divided by the sum of the counts in the group to yield a single color that represents the weighted mean of the entire color group, shown at 108. A preferred method of quantization is described in greater detail hereinbelow with reference to FIGS. 2A–3E.

Figure 2A:
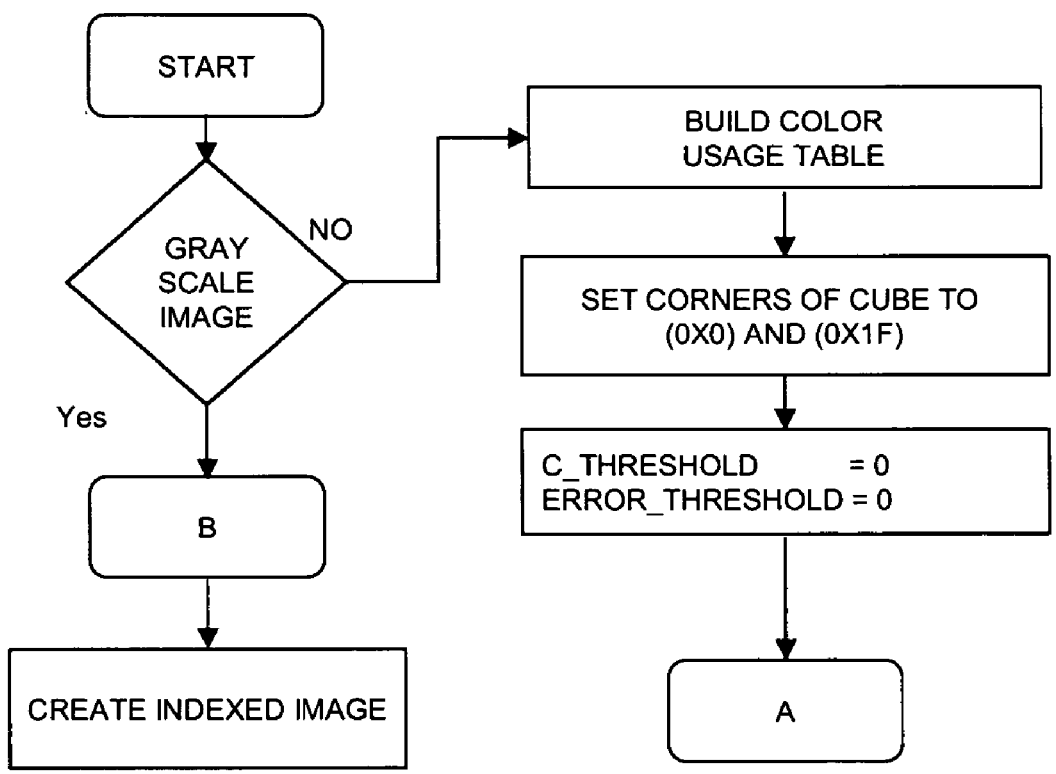
FIGS. 2A and 2B, which taken together is a simplified flow chart of a method for color quantization of a sequence of frames, operative in accordance with a preferred embodiment of the present invention.
Figure 2B:
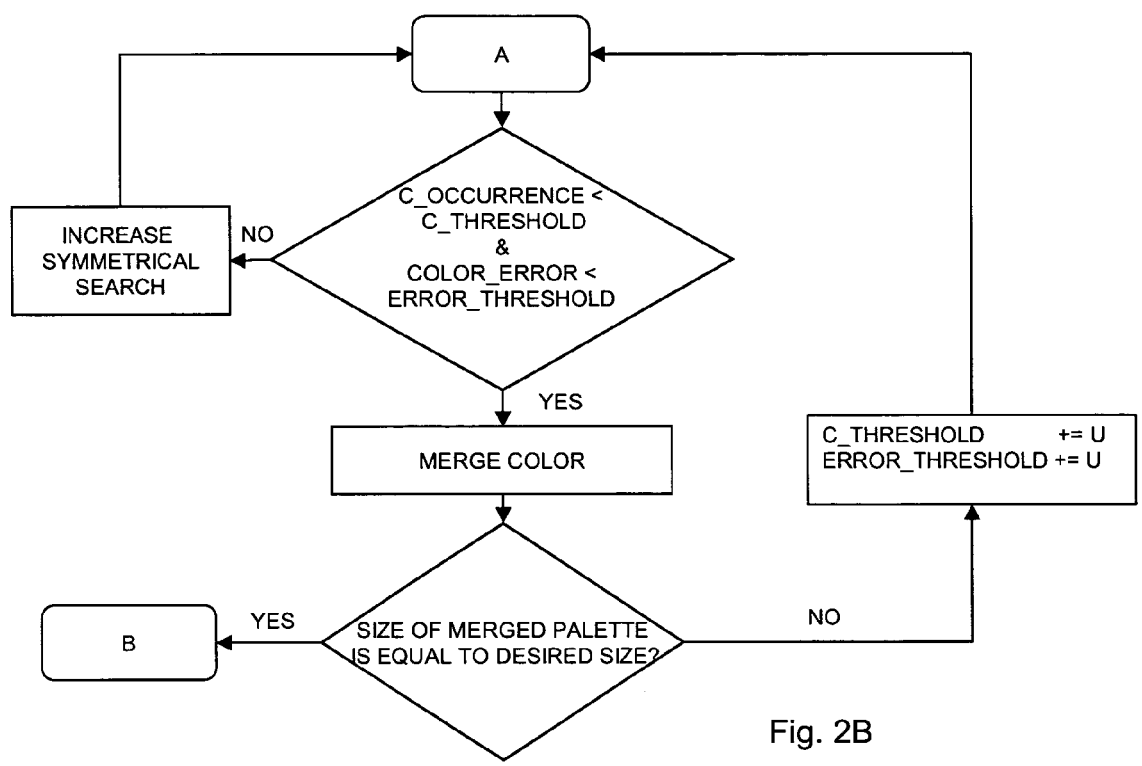

Reference is now made to FIGS. 2A and 2B, which taken together is a simplified flow chart of a method for color quantization of a sequence of frames, and to FIGS. 3A through 3E, which are simplified illustrations of color palettes, constructed and operative in accordance with a preferred embodiment of the present invention. The first stage of color quantization, the mapping of pixels in a palette to pixels in a limited palette, such as mapping 24-bit true-color pixels in a palette having $2^{24}$ colors to 24-bit true-color pixels in a limited palette having $2^{15}$ colors, may only be necessary if the pixels indeed have color. If the entire sequence of frames is composed of gray-level pixels, i.e. pixels where the values in each triplet are equivalent, the process preferably continues as described in detail in hereinbelow with reference to FIG. 4. If the pixels within the entire sequence of frames contain any non-gray scale pixels, i.e. pixels whose RGB triplet's are not equal, such as red (255,0,0) or blue (0,0,255), the quantization process continues as described hereinbelow.

The 24-bit pixels 300 in each frame of a sequence of frames may be masked with a bit mask, such as a 15-bit mask 310, in order to group the pixels into color groups of similarly colored pixels, where all pixels in a color group have the same bit-masked-value. For example, a group of 24-bit RGB pixels 300a through 300f (0xff, 0x0, 0x0), (0xfd, 0x0, 0x0), (0xfb, 0x0, 0x0), (0xff, 0x0, 0x0), (0xff, 0x0, 0x0), (0xff, 0x0, 0x0) have the same bit-masked-value (0xf8, 0x0, 0x0) after masking with a 15-bit mask (0xf8, 0x f8, 0xf8),and are therefore considered to be part of the same color group of similarly colored pixels. A count is maintained for each color in a color group of the number of occurrences of a pixel of that color. The RGB values of each color in the color group are then multiplied by its count. Thus, for example, should pixel 300a of the color (0xff, 0x0, 0x0) occur 10 times in the frame sequence, 0xff is multiplied by 10 (red), as are 0x0 (green) and 0x0 (blue). The products of each color component in a color group are then added together (i.e., all the multiplied red values are added together, all the multiplied green values are added together, etc.) and divided by the sum of the color counts (i.e., the total number of pixels in the color group), resulting in a single RGB triplet. The R, G, and B values in the triplet may be rounded up or down to eliminate fractional values. The resulting RGB triplet thus corresponds to a single color in the color group that represents the weighted average color of the pixels in the color group. A reduced 24-bit palette having $2^{15}$ colors is then represented by the weighted average color selected for each color group.

Figure 3A:
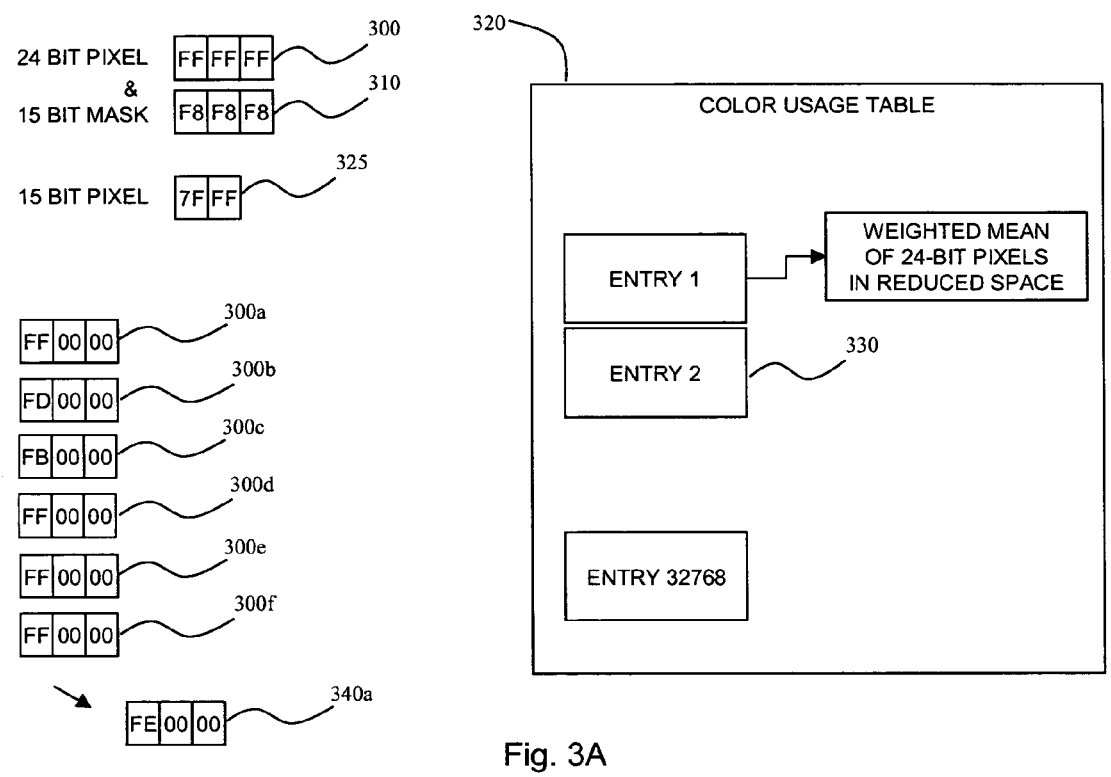
Figure 3C:
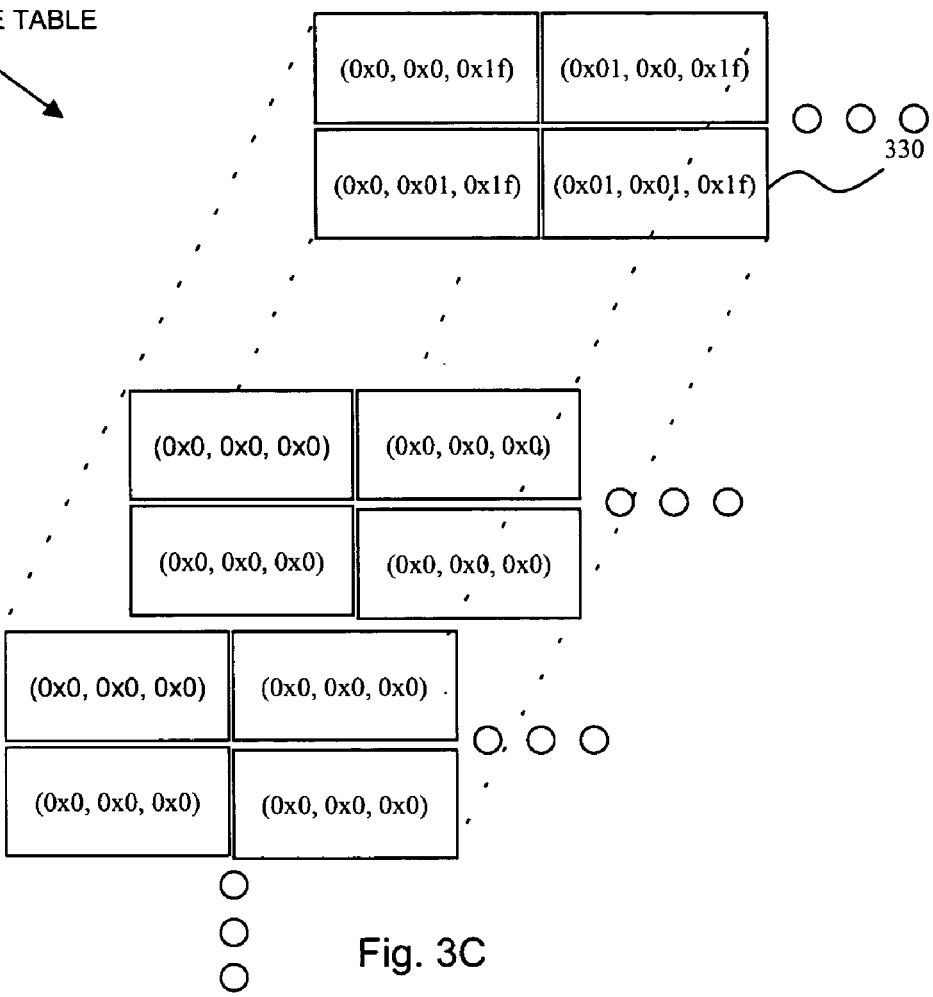

Preferably, the weighted average color of the color group at the origin of the color cube is preferably set to the color (0x0,0x0,0x0) notwithstanding the true weighted average color), as shown in FIG. 3C. Similarly, the weighted average color of the color group at the corner farthest from the origin of the color cube is preferably set to color (0xff,0xff,0xff).

A color usage table 320 is preferably constructed, such as is shown in FIG. 3B, where each entry 330 contains the weighted average color selected for a color group, as well as the sum of the pixel occurrence counts for that color group.

Figure 3D:
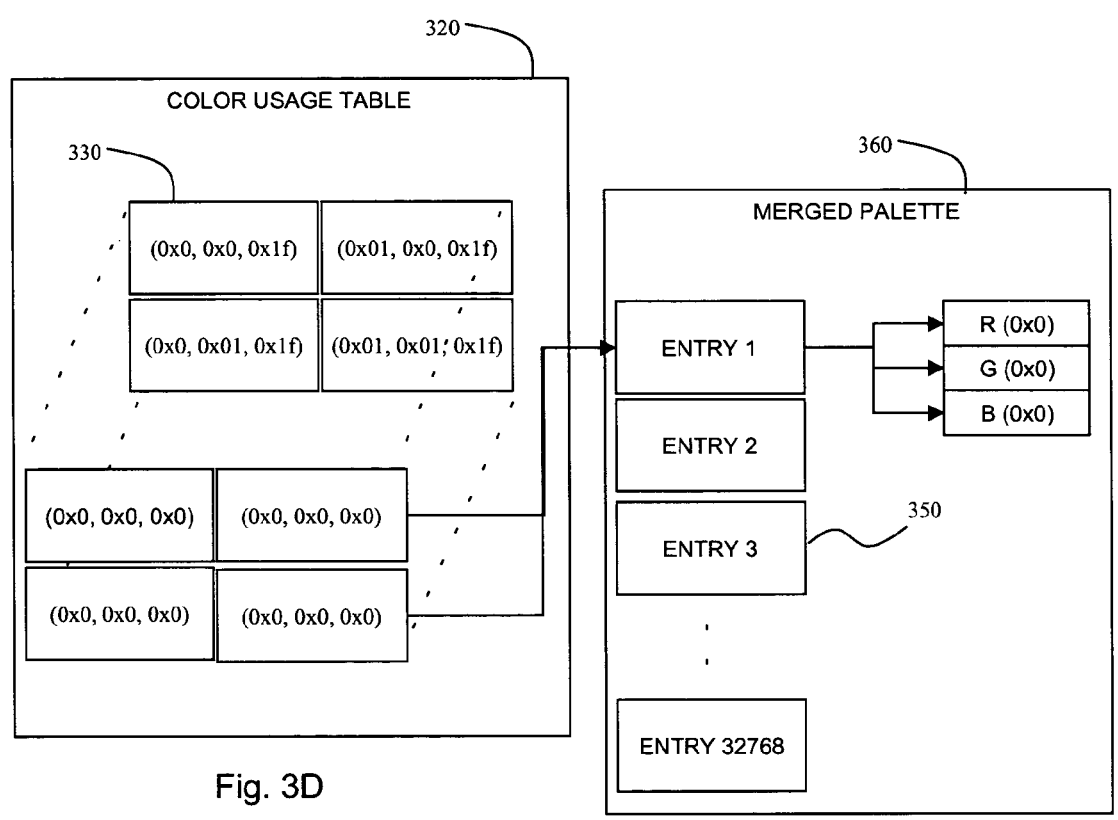

Next, the colors represented in the reduced 24-bit palette found in color usage table 320, which may have 32,768 potentially entries, may be further condensed to an 8-bit palette with a maximum of 256 entries by merging neighboring entries that are deemed relatively insignificant. The criteria of significance is typically determined by evaluating the relative number of occurrences (C_USAGE) of each pixel color, as represented in the color usage table 320, and the distortion error that would occur from merging the entries using any known measure of distortion. A symmetrical cubic search, preferably based on a Euclidian distance, is performed in which the weighted mean of each potential group of entries in table 320 to be merged is calculated in a growing fashion by increasingly extending the size of the group of entries to be merged. If the color occurrence value (C_OCCURRENCE) of an entry is below a predefined color occurrence threshold (C_THRESHOLD), and the resultant error of the weighted mean (COLOR_ERROR), i.e. the mean color after the merge as compared to the entry's color prior to the merge, is within a predefined threshold (ERROR_THRESHOLD), the entries may be merged, with each merged entry set to point to an entry 350 in a merged palette 360 containing the weighted mean of each of their R, G, and B values, as shown in FIG. 3D.

C_THRESHOLD and ERROR THRESHOLD may be set initially by employing the following formulae:

```
TRUE_COLOR_USAG_RATIO = 1500
TRUE_COLOR_QUALITY_TRADEOFF_RATIO = 800
C_THRESHOLD = ImageSize/TRUE_COLOR_USAG_RATIO;
ERROR THRESHOLD = ImageSize/TRUE_COLOR_QUALITY_TRADEOFF_RATIO;
C_THRESHOLD = MAX(C_THRESHOLD,2);
ERROR THRESHOLD = MIN(MAX(ERROR THRESHOLD,10),20);
```

Where ImageSize is equal to the number of pixels in the frame, the function MAX(a,b) returns the maximum between the two values a and b, and the function MIN(a,b) returns the minimum between the two values a and b.

Figure 3E:
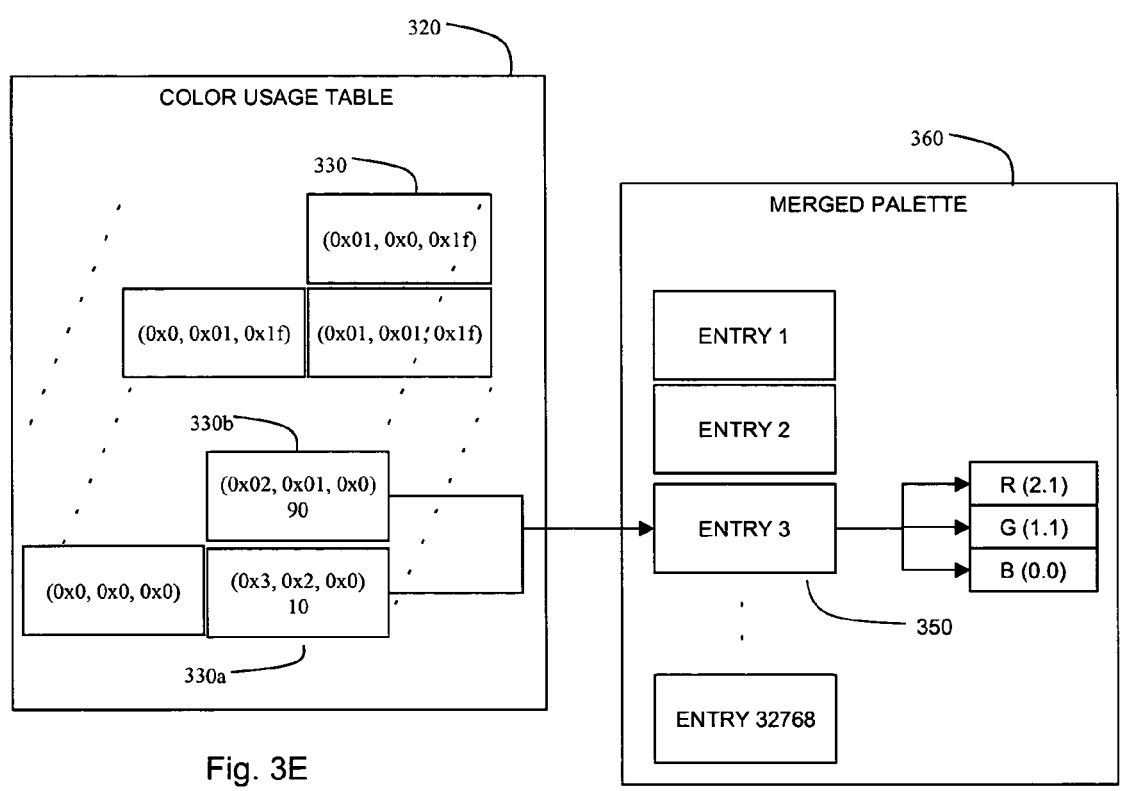

In the example shown in FIG. 3E, since the entry 330a (0x03, 0x02, 0x0) in the color usage table 320 has a color occurrence of 10, which is below a color occurrence threshold of 50, it is merged with the entry 330b (0x02, 0x01, 0x00) in the color usage table 320 whose color occurrence is 90, with the weighted mean after the merge equal to 2.1, 1.1 and 0.0. Since, the resultant error of the weighted mean with the chosen entry 330a is equal to SQRT($(3-2.1)^2+(2-1.1)^2+(0-0)^2$)=1.27, which is below an error threshold of 2, the weighted mean is inserted into the third entry 350 of the merged palette 360 with corresponding values of 2.1, 1.1 and 0.0 for their respective Red, Green and Blue values. Typically, the value of each color component is rounded up or down to the nearest integer value in the range of 0–255.

The symmetrical search and merge process may continue in an iterative process, merging clusters of colors, i.e., colors merged in previous iterations are merged again. The thresholds are typically tuned for each iteration to ensure an appropriate final size of the merged palette 360, such as 255 entries corresponding to an 8-bit color palette with an additional transparency value. For example, should the size of the merged palette still be larger than the desired size, C_THRESHOLD may be increased by multiplying the current C_THRESHOLD by a predefined value, such as by 2. ERROR THRESHOLD may also be increased by adding a predefined value to the current ERROR THRESHOLD, such as 10.

After the construction of the merged palette 360, a set of indexed images corresponding to the frames of the original video are preferably constructed based on the new merged palette 360, where each pixel in the indexed image points to an entry in merged palette 360.

Figure 4A:
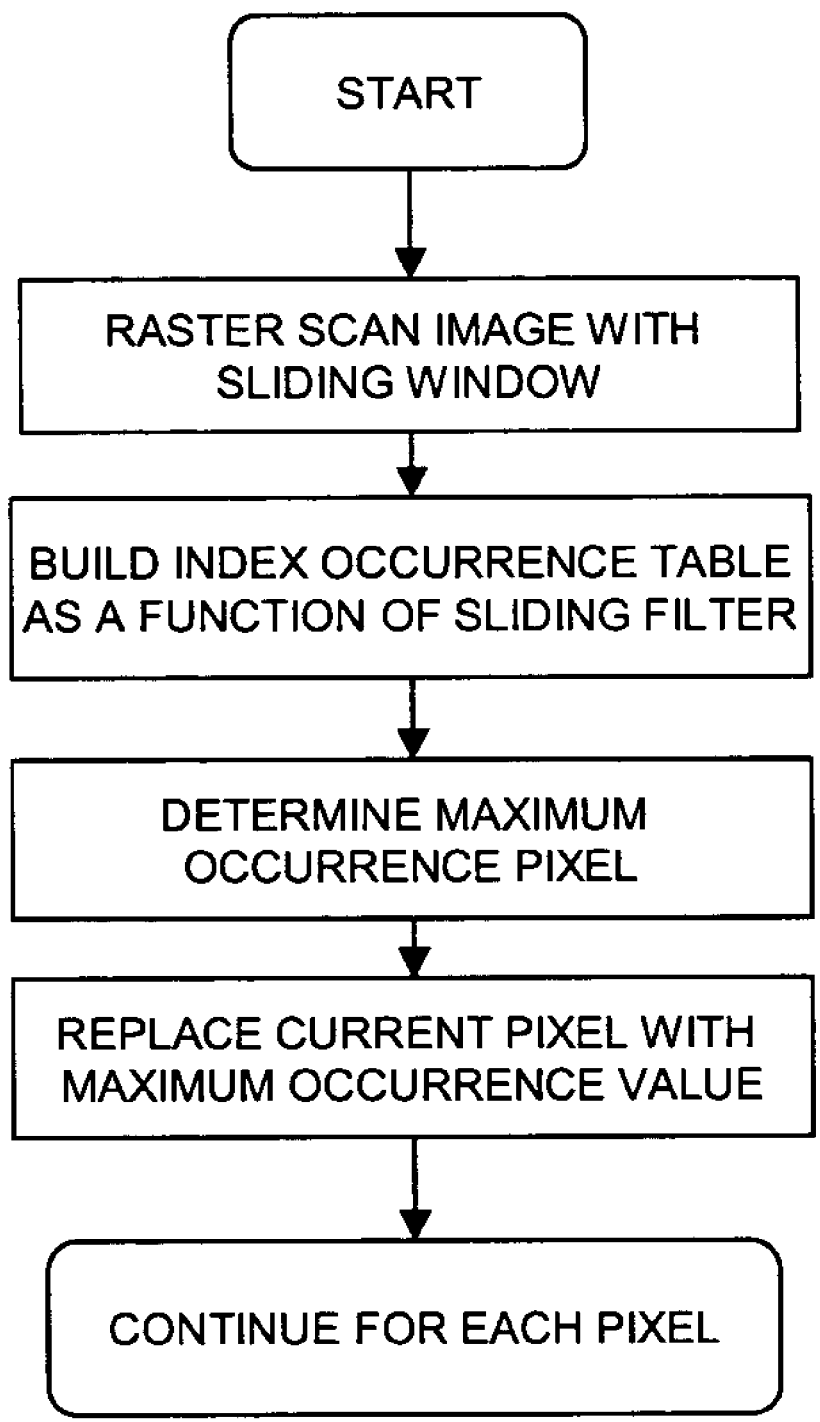
FIG. 4A is a simplified flow chart of a method for smoothing an indexed palletized image, operative in accordance with a preferred embodiment of the present invention.
Figure 4B:
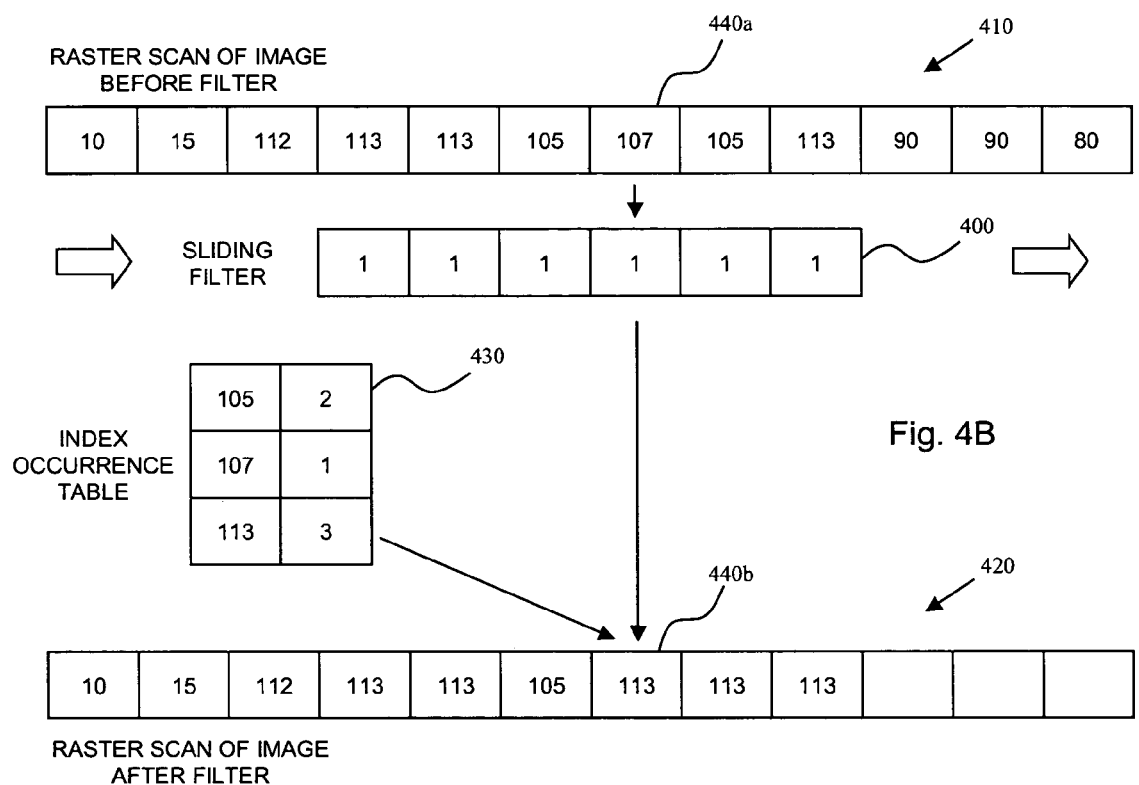
FIG. 4B is a simplified pictorial illustration of a segment of an indexed palletized image and a sliding filter, constructed and operative in accordance with a preferred embodiment of the present invention.

Reference is now made to FIG. 4A which is a simplified flow chart of a method for smoothing an indexed palletized image, and FIG. 4B, which is a simplified pictorial illustration of a segment of an indexed palletized image and a sliding filter, constructed and operative in accordance with a preferred embodiment of the present invention. The present invention includes a smoothing stage, prior to compression, to filter out minor noises that may have otherwise disrupted the coherence of a sequence of pixels.

In the method of FIG. 4A, a sliding filter, typically constructed to place emphasis on earlier-scanned portions of the image as described hereinbelow, is preferably applied in turn to each pixel of the palletized images in a raster fashion. For example, a sliding filter 400 depicted in FIG. 4B may be used for assigning to a pixel 440a a new index value corresponding to the index values occurring most often among the three preceding pixels and two subsequent pixels surrounding pixel 440a, as defined by the length and placement of filter 400. A raster scan 410 of an image before filter 400 is applied may be converted to a raster scan 420 of an image after filter 400 is applied in conjunction with an index occurrence table 430. Thus, in the example shown in FIG. 4A, the index value occurring most often among the pixels preceding and following pixel 440a and within the area defined by filter 400 is 113, which occurs 3 times. The number of occurrences of a pixel may be weighted by the values shown in filter 400, being a uniform weight of 1 in the example shown. Pixel 440a is therefore given the index value 113, as shown as 440b. Line filters are well suited to filter out noise that would have otherwise interfered with a raster based compression algorithm such as the one employed in a GIF compressor.

Figure 5B:
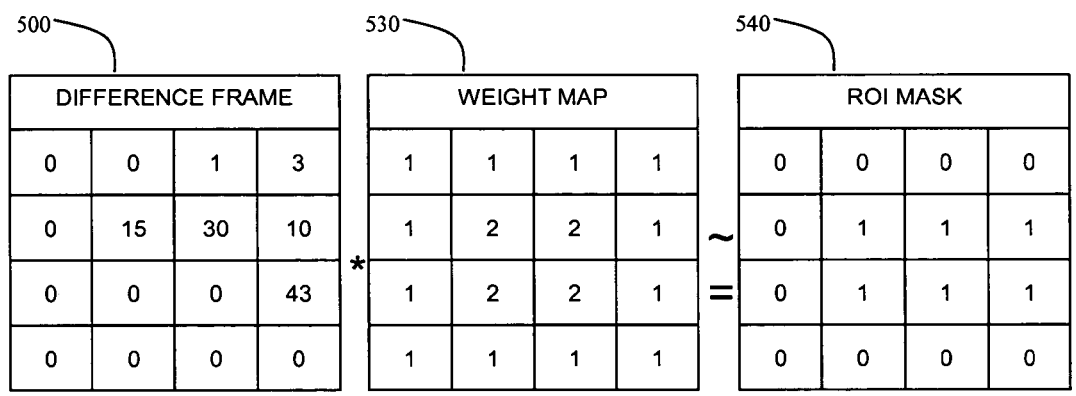
Figure 5C:
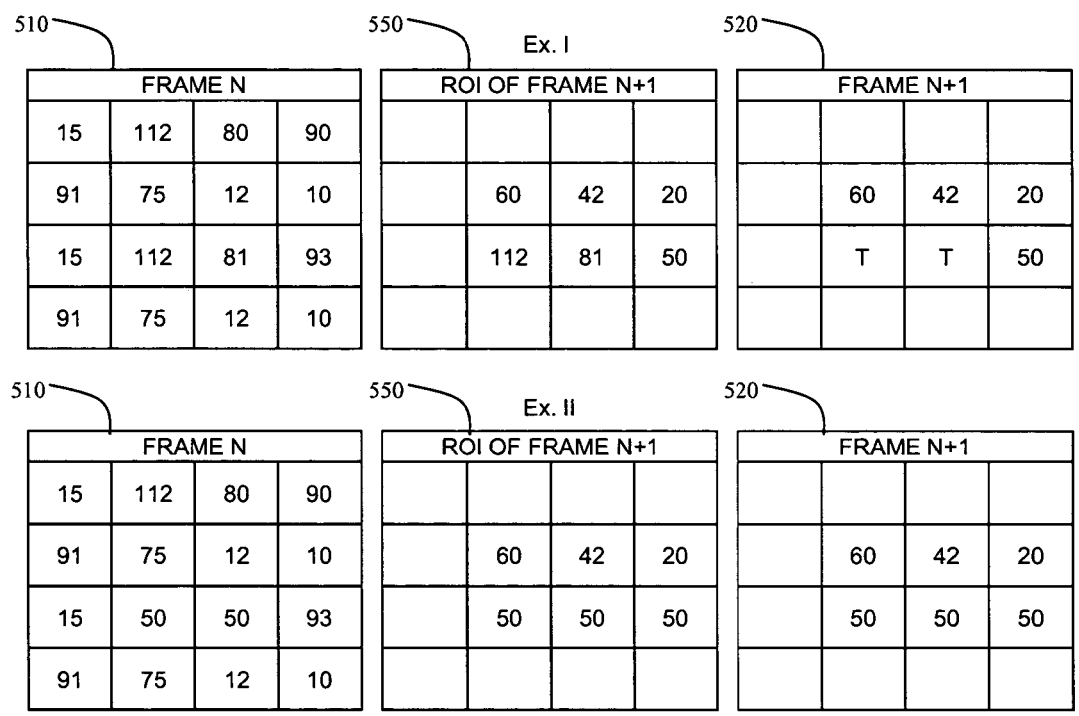
Figure 5D:
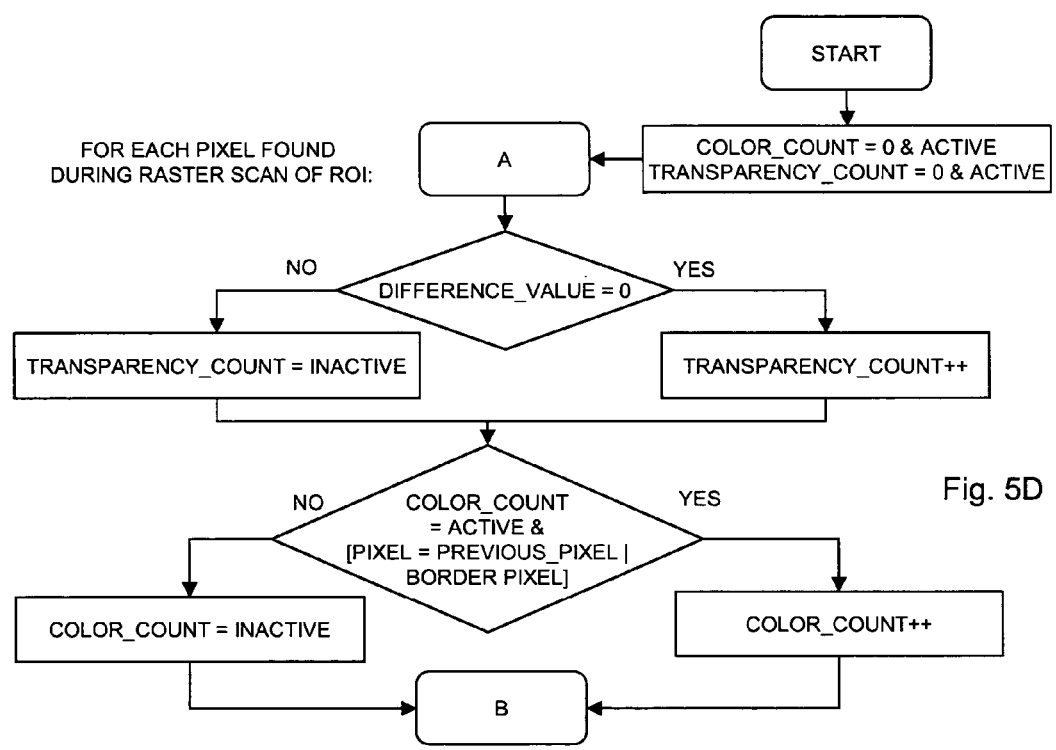
Figure 5E:
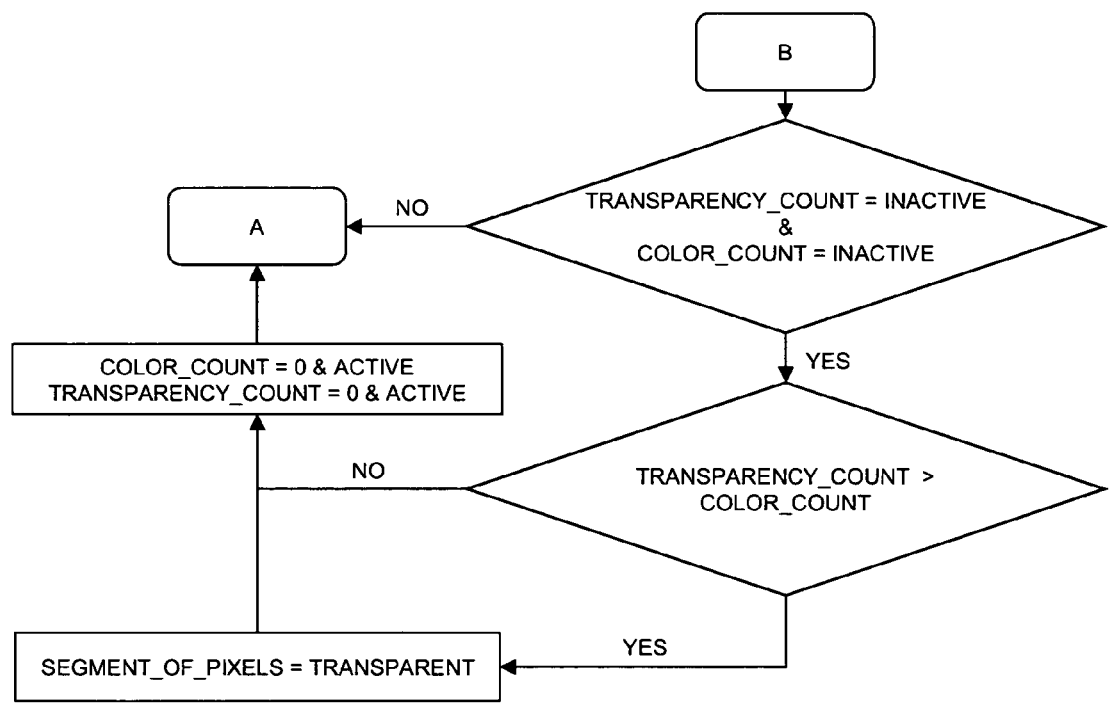

Reference is now made to FIG. 5A through FIG. 5C, which is a simplified illustration of a method for processing a region of interest in a sequence of frames constructed and operative in accordance with a preferred embodiment of the present invention. The Flowcharts of FIGS. 5D and 5E illustrate the processing of the data of the region of interest in a sequence of frames. A region of interest in a particular frame is typically defined as an area within a frame where relatively large changes occurred with reference to its previous frame. To enhance the compression of the sequence of frames, all pixels outside the region or regions of interest are typically set to the index representing 'transparency'. Transparent pixels may be reconstructed by the recipient by utilizing the preceding frame's pixel values and as such their values need not be transmitted independently. The region of interest is preferably defined as follows:

First, a difference frame 500 is preferably constructed by calculating the pixel by pixel absolute difference between two consecutive frames, frame N 510 and frame N+1 520. The difference frame 500 may be multiplied by a weight map 530 to emphasize key areas in the frame N+1 520, such as the center of a frame. Weighted difference products that exceed a predefined arbitrarily chosen threshold, such as 9, receive a value of 1, whereas products that are less than the threshold receive a value of 0, while products that equal the threshold may be consistently given either 0 or 1. These values are then stored in a Region of Interest (ROI) mask 540. ROI mask 540 typically defines a bounding rectangle of a region of relative importance whose members have a predefined value, such those pixel positions in ROI mask 540 whose value is equal to 1. The pixels in a frame positionally corresponding to the pixel positions in the bounding rectangle define a region of interest. Note, that the ROI mask 540 may include pixels that have no relative change, yet due to the nature of the bounding rectangle are included within the ROI mask 540. For example, the pixels in frame N+1 520 in FIG. 5A in the $2^{nd}$ and $3^{rd}$ columns of the third row (whose values are 112 and 81) have identical values to those in the preceding frame, frame N 510, as is evident in the difference frame 500, yet they are included within the ROI mask 540 in FIG. 5B.

While pixels in the original frame, frame N+1 520 in FIG. 5A, outside the bounding rectangle are not transmitted and may be reconstructed based on the previous frame, pixels within the bounding rectangle may be set to the 'transparent pixel'. This may occur if the bounding rectangle of the ROI mask 540 incorporates pixels that have no relative change and are not part of a larger sequence of contiguous pixels with identical values. For example, in FIG. 5C, frame N+1 520 in Example I contains two pixels in the $2^{nd}$ and $3^{rd}$ columns of the third row that have identical values to those in the preceding frame, 112 and 81 respectively. Since these pixels are not part of a larger sequence of contiguous pixels with identical values, their values are adjusted to equal that of the 'transparent pixel', labeled 'T'. In Example II, although the pixels in the $2^{nd}$ and $3^{rd}$ columns of the third row have the same value as the preceding frame, being all equal to 50, because they are part of a larger contiguous sequence with identical values in frame N+1 520 that includes the pixel in the $4^{th}$ column of the third row, their values are not modified.

The decision whether to set pixels within the region of interest to a transparent pixel value may be made by identifying a segment of pixels in the region of interest, beginning at a pixel location corresponding to a pixel location in difference frame 500 whose value is equal to 0, thus marking the pixel as a candidate for transparency. If from that pixel location a run of contiguous pixels in the region of interest exists whose corresponding pixel locations in difference frame 500 all have a value equal to 0, the length of the transparency candidate run is noted. Similarly, if from that pixel location a run of contiguous pixels in the region of interest exists having identical color values, the length of the identical color run is also noted. The length of the segment within the region of interest is thus defined as the length of the transparency candidate run if no identical color run overlaps it, or as the longer of the two runs where both runs exist. The pixel values of the entire segment are then changed to a transparent pixel value if the transparency candidate run is longest, or left as is if the identical color run is longest. Where both runs are found and are equal in length, either course of action may be taken, preferably consistently.

Preferably, the decision whether to set pixels within a region of interest to a transparent pixel value is made according to the following algorithm. Each region of interest is scanned in a raster fashion. Two counters, a TRANSPARENCY_COUNT and a COLOR_COUNT, are maintained throughout the raster scan to determine which of two contiguous sequences is longer, the transparent sequence or the color sequence. The counters may be in one of two states, active or inactive. The counters are initially set as active and their values set to zero. Next, an analysis is performed for a segment of the frame, which may be any contiguous set of pixels within the region of interest. Any pixels that are encountered within the segment whose value in the difference frame 500 is equal to 0 are candidates for transparency, in which case the TRANSPARENCY_COUNT may be incremented by one. Any pixel that is the first in the segment or whose value is identical to that of the preceding pixel in the raster scan may belong to a larger contiguous color sequence, in which case the COLOR_COUNT may be incremented by one. When a pixel is encountered during the raster scan whose value in the difference frame 500 is not equal to 0, the TRANSPARENCY_COUNT is set to inactive and may not be further incremented. Similarly, if a pixel is encountered during the raster scan whose value is different than that of the preceding pixel, the COLOR_COUNT is set to inactive and may not be further incremented. When both counters are set to inactive a comparison is performed between them. The counter whose value is greater is termed the 'winner', and all the pixels analyzed within this segment are set appropriately, i.e. if the color counter won, the values of the pixels in the segment are preserved, and if the transparency counter won, all the pixels in the segment are set to the index representation of the transparent pixel.

Should the value of the counters be equal, priority may be given to color. Alternatively priority may be given to transparency.

The counters may then be reset to active and their values set to zero, with the process repeated for another segment.

Figure 6:
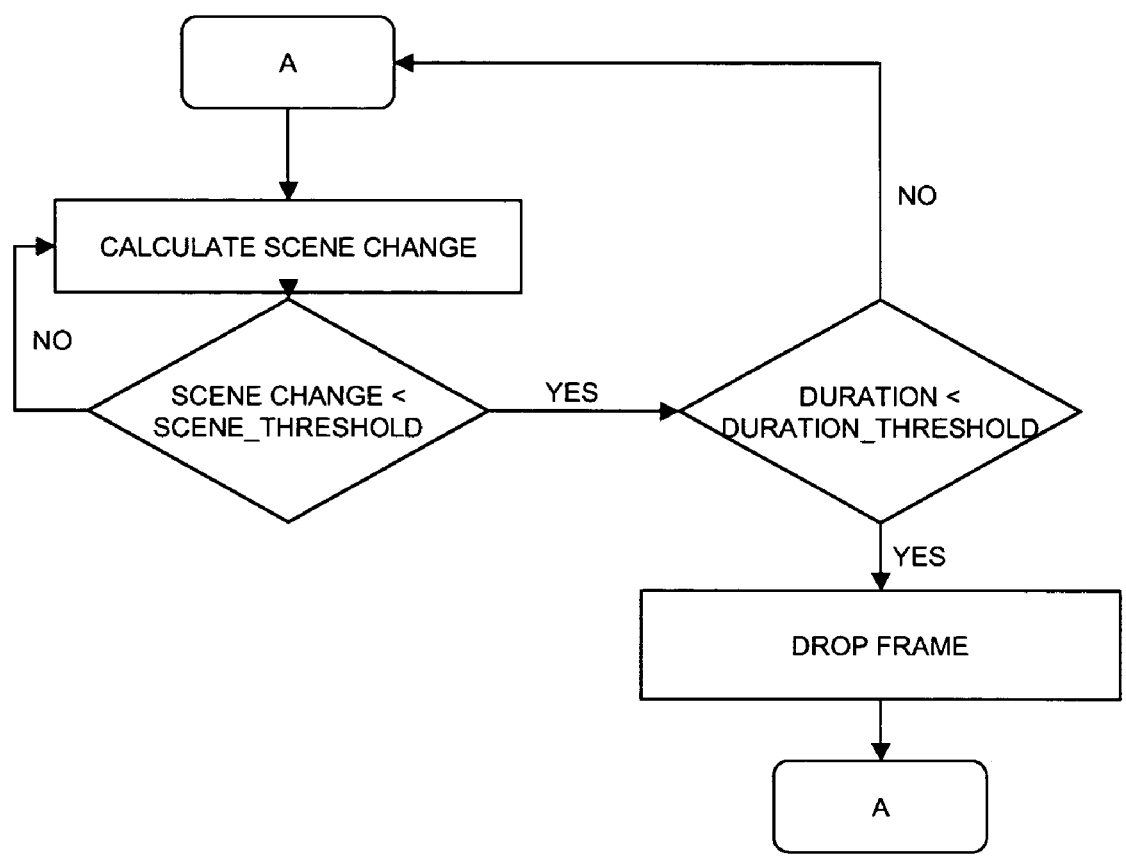
FIG. 6 is a simplified flow chart of a method for frame selection, operative in accordance with a preferred embodiment of the present invention.

Reference is now made to FIG. 6, which is a simplified flow chart of a method for frame selection, operative in accordance with a preferred embodiment of the present invention. To further reduce the size of the video, individual frames may be dropped, i.e. removed from the sequence of frames. Which frames to drop is preferably determined during an iterative process in which the video size is estimated, preferably its compressed size. Should the estimated size exceed a predefined limit, frames that are considered to have the least information are dropped. The amount of information in a frame may be expressed in terms magnitude of change that occurs from one frame to the next. One measure of a magnitude of change that may be used is defined herein as SCENE CHANGE, which is preferably calculated separately for each pair of consecutive frames using the following formula:

$$\text{SCENE CHANGE} = \frac{1}{N*M} * \sum_{N}^{1} \sum_{M}^{1} |p1(i,j) - p2(i,j)| * w(i,j)$$

where N and M are the ROI dimensions, $p_k(i,j)$ is the value of pixel (i,j) in the $k_{th}$ frame and frame is preferably determined by dividing the sum of absolute difference between pixels in the region of interest of the frame with corresponding pixels in the other frame by the number of pixels in the region of interest.

Thus in the method of FIG. 6, the size of a video segment is calculated. If the size exceeds a predefined limit, the SCENE CHANGE is calculated for a frame. If SCENE CHANGE is below a predefined threshold, the frame is dropped. The size of a video segment may then be recalculated to determine if the predefined limit is still exceeded.

Once a frame is dropped, the region of interest and transparency pixels for the subsequent frame may be affected. Therefore, these aspects of the frame are preferably recalculated as described hereinabove before the decision whether to drop the subsequent frame is made. Alternatively, this recalculation may be carried out only after a predefined number of frames within a predefined sequence of frames are dropped, such as after 3 of 10 frames are dropped. Alternatively, no recalculation is performed.

The duration of display for each frame may also be calculated. Should the duration of display for a particular frame exceed a DURATION_THRESHOLD, which may be predefined, if the frame would otherwise be dropped based on its SCENE CHANGE value, the frame is preferably not dropped from the sequence.

The iterative process of FIG. 6 typically concludes when the estimated movie size is within the limits imposed.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for converting video from a first format into a second format, the method comprising:
    decoding into a series of frames video that is encoded in a first format;
    mapping the colors represented in said frames into a palette having fewer colors than the number of colors represented in said frames;
    removing noise from said frames;
    selectably removing at least one frame from said sequence; and
    re-encoding said sequence using said fewer colors into a second video format wherein said mapping step comprises: mapping a plurality of pixels in a series of said video frames to a corresponding color in said palette; defining a plurality of groups of colors in said palette; weighting each of the colors in any of said color groups by its respective number of occurrences of each of said pixels of a particular color, wherein said weighting is applied to each color value in the color to be weighted; summing said weighted color values in any of said color groups; summing said number of occurrences of each of said pixels in said color group; and dividing said summed weighted color values in said color group by said summed number of occurrences, thereby yielding a single color that represents the weighted mean of the said color group.

2. A method according to claim 1 wherein said defining step comprises masking said pixels with a bit mask.

3. A method according to claim 1 and further comprising maintaining a count for each of said numbers of occurrences.

4. A method according to claim 1 wherein said summing steps comprise separately summing for each color component of said color group.

5. A method according to claim 1 wherein said dividing step comprises separately dividing each color component of said color group by said summed number of occurrences.

6. A method according to claim 1 and further comprising merging said weighted mean color with a neighboring weighted mean color wherein said summed number of occurrences of said first-mentioned weighted mean color is below a predefined occurrence threshold, and wherein the difference between the merged color value and the value of said first-mentioned weighted mean color is below a predefined error threshold.

7. A method according to claim 6 wherein said merging step is performed a plurality of times until a merged palette is formed having a predetermined number of weighted mean colors.

8. A method according to claim 7 and further comprising constructing a set of indexed images corresponding to said frames of said original video where each pixel in said indexed images points to a color in said merged palette.

9. A method according to claim 1 wherein said removing noise step comprises:
rasterwise scanning the pixels of palletized images of said frames with a sliding window;
determining a pixel value occurring most often within said window; and
setting any of said pixels within said window to said most often occurring pixel value.

10. A method according to claim 9 wherein said setting step comprises setting one of said pixels within a first distance from the leading extent of said window and within a second distance from the trailing extent of said window to said most often occurring pixel value.

11. A method according to claim 10 wherein said setting step comprises setting where said distances differ.

12. A method according to claim 9 and further comprising weighting any of said pixel values occurring within said window in accordance with a positionally corresponding predefined weight, wherein said weighting step is performed prior to performing said determining step.

13. A method according to claim 1 wherein said removing noise step comprises:
deriving a difference frame between two consecutive frames in a sequence of said frames, wherein each pixel position value in said difference frame is set equal to the absolute pixel value difference between its positionally corresponding pixels in both of said consecutive frames;
deriving a region of interest mask by multiplying the pixel position values in said difference frame by a weight map and setting any of said pixel position values in said region of interest mask to a predefined value as a function of its weighted value with respect to a predefined threshold;
defining a region of interest within the last of said two consecutive frames to include pixels that positionally correspond to pixel positions in said region of interest mask that have a predefined value; and
setting any of said pixels in the last of said two consecutive frames that lie inside said region of interest as transparent pixels if said pixels are identical to their positionally corresponding pixels in the first of said two consecutive frames and if said pixels are not part of a larger sequence of contiguous pixels with identical values.

14. A method according to claim 13 and further comprising excluding any of said pixels in the last of said two consecutive frames that lie outside said region of interest from being used to reconstruct said last frame.

15. A method according to claim 13 and further comprising:
identifying a segment of pixels in said region of interest, beginning at a pixel location corresponding to a pixel location in said difference frame whose value is equal to 0;
determining the number of contiguous pixels in said region of interest extending from said pixel location whose corresponding pixel locations in said difference frame all have a value equal to 0, thereby resulting in a transparency candidate run length;
determining the number of contiguous pixels in said region of interest extending from said pixel location having identical color values, thereby resulting in an identical color run length;
determining the length of said segment as the longer of said run lengths; and
setting the values of the pixels in said segment to a transparent pixel value if said transparency candidate run is longest.

16. A method according to claim 1 wherein said selectably removing step comprises:
determining the size of a video segment; and
should said size exceed a predefined limit:
measuring the amount of information in a frame of said video segment; and
dropping the frame if said amount of information is below a predefined threshold.

17. A method according to claim 16 wherein said measuring step comprises:
selecting said frame as part of two consecutive frames; and
measuring the magnitude of change that occurs between said frame the other selected frame.

18. A method according to claim 17 wherein said measuring magnitude of change step comprises measuring using the following formula:

$$\text{SCENE CHANGE} = \frac{1}{N*M} * \sum_{N}^{1} \sum_{M}^{1} |p1(i,j) - p2(i,j)| * w(i,j)$$

where N and M are the ROI dimensions, $p_k(i,j)$ is the value of pixel (i,j) in the $k_{th}$ frame and w(i,j) is a weight of a pixel.

19. A method according to claim 17 wherein said measuring magnitude of change step comprises dividing the sum of absolute difference between pixels in a region of interest of said frame with corresponding pixels in the other selected frame by the number of pixels in said region of interest.

20. A method according to claim 16 and further comprising performing said steps a plurality of times for a plurality of frames of said video segment until said size does not exceed said predefined limit.

21. A method according to claim 20 and further comprising recalculating a region of interest and transparency pixels for a subsequent frame of said dropped frame.

22. A method according to claim 16 and further comprising:
  calculating a display duration for said frame to be dropped;
  retaining said frame in said video sequence if said display duration exceeds a predefined duration threshold.

23. A system for converting video from a first format into a second format, the system comprising:
  means for decoding into a series of frames video that is encoded in a first format;
  means for mapping the colors represented in said frames into a palette having fewer colors than the number of colors represented in said frames;
  means for removing noise from said frames;
  means for selectably removing at least one frame from said sequence; and
  means for re-encoding said sequence using said fewer colors into a second video format wherein said means for mapping comprises: means for mapping a plurality of pixels in a series of said video frames to a corresponding color in said palette; means for defining a plurality of groups of colors in said palette; means for weighting each of the colors in any of said color groups by its respective number of occurrences of each of said pixels of a particular color, wherein said weighting is applied to each color value in the color to be weighted; means for summing said weighted color values in any of said color groups;
  means for summing said number of occurrences of each of said pixels in said color group; and means for dividing said summed weighted color values in said color group by said summed number of occurrences, thereby yielding a single color that represents the weighted mean of the said color group.

24. A system according to claim 23 wherein said means for defining is operative to masking said pixels with a bit mask.

25. A system according to claim 23 and further comprising means for maintaining a count for each of said numbers of occurrences.

26. A system according to claim 23 wherein said means for summing are operative to separately sum for each color component of said color group.

27. A system according to claim 23 wherein said means for dividing is operative to separately divide each color component of said color group by said summed number of occurrences.

28. A system according to claim 23 and further comprising means for merging said weighted mean color with a neighboring weighted mean color wherein said summed number of occurrences of said first-mentioned weighted mean color is below a predefined occurrence threshold, and wherein the difference between the merged color value and the value of said first-mentioned weighted mean color is below a predefined error threshold.

29. A system according to claim 28 wherein said means for merging is operative to merge a plurality of times until a merged palette is formed having a predetermined number of weighted mean colors.

30. A system according to claim 29 and further comprising means for constructing a set of indexed images corresponding to said frames of said original video where each pixel in said indexed images points to a color in said merged palette.

31. A system according to claim 23 wherein said means for removing noise comprises:
  means for rasterwise scanning the pixels of palletized images of said frames with a sliding window;
  means for determining a pixel value occurring most often within said window; and
  means for setting any of said pixels within said window to said most often occurring pixel value.

32. A system according to claim 31 wherein said means for setting is operative to set one of said pixels within a first distance from the leading extent of said window and within a second distance from the trailing extent of said window to said most often occurring pixel value.

33. A system according to claim 32 wherein said means for setting is operative to set where said distances differ.

34. A system according to claim 31 and further comprising means for weighting any of said pixel values occurring within said window in accordance with a positionally corresponding predefined weight, wherein said means for weighting is operative to weight prior to performing said determining step.

35. A system according to claim 1 wherein said means for removing noise comprises:
  means for deriving a difference frame between two consecutive frames in a sequence of said frames, wherein each pixel position value in said difference frame is set equal to the absolute pixel value difference between its positionally corresponding pixels in both of said consecutive frames;
  means for deriving a region of interest mask by multiplying the pixel position values in said difference frame by a weight map and setting any of said pixel position values in said region of interest mask to a predefined value as a function of its weighted value with respect to a predefined threshold;
  means for defining a region of interest within the last of said two consecutive frames to include pixels that positionally correspond to pixel positions in said region of interest mask that have a predefined value; and
  means for setting any of said pixels in the last of said two consecutive frames that lie inside said region of interest as transparent pixels if said pixels are identical to their positionally corresponding pixels in the first of said two consecutive frames and if said pixels are not part of a larger sequence of contiguous pixels with identical values.

36. A system according to claim 35 and further comprising means for excluding any of said pixels in the last of said two consecutive frames that lie outside said region of interest from being used to reconstruct said last frame.

37. A system according to claim 35 and further comprising:
- means for identifying a segment of pixels in said region of interest, beginning at a pixel location corresponding to a pixel location in said difference frame whose value is equal to 0;
- means for determining the number of contiguous pixels in said region of interest extending from said pixel location whose corresponding pixel locations in said difference frame all have a value equal to 0, thereby resulting in a transparency candidate run length;
- means for determining the number of contiguous pixels in said region of interest extending from said pixel location having identical color values, thereby resulting in an identical color run length;
- means for determining the length of said segment as the longer of said run lengths; and
- means for setting the values of the pixels in said segment to a transparent pixel value if said transparency candidate run is longest.

38. A system according to claim 23 wherein said means for selectably removing comprises:
- means for determining the size of a video segment;
- means for measuring the amount of information in a frame of said video segment where said size exceeds a predefined limit; and
- means for dropping the frame if said amount of information is below a predefined threshold.

39. A system according to claim 38 wherein said means for measuring is operative to:
- select said frame as part of two consecutive frames; and
- measure the magnitude of change that occurs between said frame the other selected frame.

40. A system according to claim 39 wherein said means for measuring magnitude of change is operative to measure using the following formula:

$$\text{SCENE CHANGE} = \frac{1}{N*M} * \sum_{N}^{1} \sum_{M}^{1} |p1(i,j) - p2(i,j)| * w(i,j)$$

where N and M are the ROI dimensions, $p_k(i,j)$ is the value of pixel (i,j) in the $k_{th}$ frame and w(i,j) is a weight of a pixel.

41. A system according to claim 39 wherein said means for measuring magnitude of change is operative to divide the sum of absolute difference between pixels in a region of interest of said frame with corresponding pixels in the other selected frame by the number of pixels in said region of interest.

42. A system according to claim 38 wherein said means are operative for a plurality of frames of said video segment until said size does not exceed said predefined limit.

43. A system according to claim 42 and further comprising means for recalculating a region of interest and transparency pixels for a subsequent frame of said dropped frame.

44. A system according to claim 38 and further comprising:
- means for calculating a display duration for said frame to be dropped;
- means for retaining said frame in said video sequence if said display duration exceeds a predefined duration threshold.

* * * * *